(12) United States Patent
Satomi et al.

(10) Patent No.: US 9,497,357 B2
(45) Date of Patent: Nov. 15, 2016

(54) IMAGE COMPRESSING/DECOMPRESSING APPARATUS AND IMAGE FORMING APPARATUS

(71) Applicant: KYOCERA Document Solutions Inc., Osaka (JP)

(72) Inventors: Seiki Satomi, Osaka (JP); Toshiaki Mutsuo, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 15/036,798

(22) PCT Filed: Nov. 10, 2014

(86) PCT No.: PCT/JP2014/079751
§ 371 (c)(1),
(2) Date: May 13, 2016

(87) PCT Pub. No.: WO2015/076139
PCT Pub. Date: May 28, 2015

(65) Prior Publication Data
US 2016/0286096 A1    Sep. 29, 2016

(30) Foreign Application Priority Data
Nov. 20, 2013  (JP) .................................. 2013-240291

(51) Int. Cl.
*H04N 1/40* (2006.01)
*H04N 1/60* (2006.01)
*H04N 1/64* (2006.01)
*H04N 1/58* (2006.01)
*G06K 9/44* (2006.01)

(52) U.S. Cl.
CPC ................ *H04N 1/648* (2013.01); *G06K 9/44* (2013.01); *H04N 1/58* (2013.01); *H04N 1/6005* (2013.01); *H04N 2201/0094* (2013.01)

(58) Field of Classification Search
CPC ...... H04N 1/648; H04N 1/58; H04N 1/6005; H04N 2201/0094; G06K 9/44
See application file for complete search history.

(56) References Cited

U.S. PATENT DOCUMENTS

2006/0132857 A1* 6/2006 Akashi .................. G06K 15/02
358/448
2009/0244633 A1* 10/2009 Johnston ................ H04N 1/648
358/3.23

FOREIGN PATENT DOCUMENTS

JP    H10-503899    4/1998
WO   WO96-02894    2/1996

* cited by examiner

Primary Examiner — Quang N Vo

(57) ABSTRACT

A subsampling unit (2) converts pixel values of plural pixels in a pixel block in the chroma plane to one pixel value associated with the pixel block on the basis of values in the pixel block in an attribute plane that indicates existency of an edge at the predetermined resolution. A compression processing unit (3) performs a compression process for a luma plane and the chroma planes for which the subsampling has been performed by the subsampling unit (2).

4 Claims, 2 Drawing Sheets

FIG. 2

| Y00 | Y01 |
|-----|-----|
| Y10 | Y11 |

| Cb00 | Cb01 |
|------|------|
| Cb10 | Cb11 |

| Cr00 | Cr01 |
|------|------|
| Cr10 | Cr11 |

| A00 | A01 |
|-----|-----|
| A10 | A11 |

→

| Y00 | Y01 |
|-----|-----|
| Y10 | Y11 |

Cb

Cr

| A00 | A01 |
|-----|-----|
| A10 | A11 |

IMAGE COMPRESSING/DECOMPRESSING APPARATUS AND IMAGE FORMING APPARATUS

TECHNICAL FIELD

The present invention relates to an image compressing/decompressing apparatus and an image forming apparatus.

BACKGROUND ART

In image compression such as JPEG (Joint Photographic Experts Group), an image is converted into YCbCr space and then compressed using DCT (Discrete Cosine Transform) or the like. In this process, human eyes have a visual perception characteristic that is sensitive to luminance variation but insensitive to chroma variation, and in some cases, utilizing such visual perception characteristic, a Cb plane and a Cr plane are subsampled (see PATENT LITERATURE #1).

CITATION LIST

Patent Literature

Patent Literature #1
Japanese National Publication of International Application No. H10-503899.

SUMMARY OF INVENTION

Technical Problem

However, the aforementioned subsampling incurs color bleeding on an edge part of an image such as a character expressed with two values of low and high densities without any intermediate gradation levels and consequently causes low image quality.

In addition, in a case that a process such as smoothing is performed for an edge after the compression and the decompression, such process may not be properly performed in the edge part with the color bleeding.

The present invention has been made in view of the aforementioned problem. It is an object of the present invention to achieve an image compressing/decompressing apparatus and an image forming apparatus enabling subsampling of a favorable compression ratio and favorable image quality and performing a post process such as smoothing after decompression.

Solution to Problem

An image compressing/decompressing apparatus according to the present invention includes: a subsampling unit that performs subsampling of chroma planes at a predetermined resolution; a compression processing unit that performs a compression process for a luma plane and the chroma planes for which the subsampling has been performed by the subsampling unit; a decompression processing unit that decompresses compressed data generated in the compression process performed by the compression processing unit to the luma plane and the subsampled chroma planes; and an interpolation processing unit that performs an interpolation process, the interpolation process restoring the subsampled chroma planes to the predetermined resolution. The subsampling unit converts pixel values of plural pixels in a pixel block in the chroma planes to one pixel value associated with the pixel block on the basis of values in the pixel block in an attribute plane that indicates existency of an edge at the predetermined resolution.

The image forming apparatus according to the present invention includes the aforementioned image compressing/decompressing apparatus.

Advantageous Effects of Invention

On the basis of the present invention, achieved are an image compressing/decompressing apparatus and an image forming apparatus enabling subsampling of a favorable compression ratio and favorable image quality and performing a post process such as smoothing after decompression.

BRIEF DESCRIPTION OF DRAWINGS

FIG. 2 shows a diagram that explains an example of subsampling.

DESCRIPTION OF EMBODIMENTS

Figure 1:
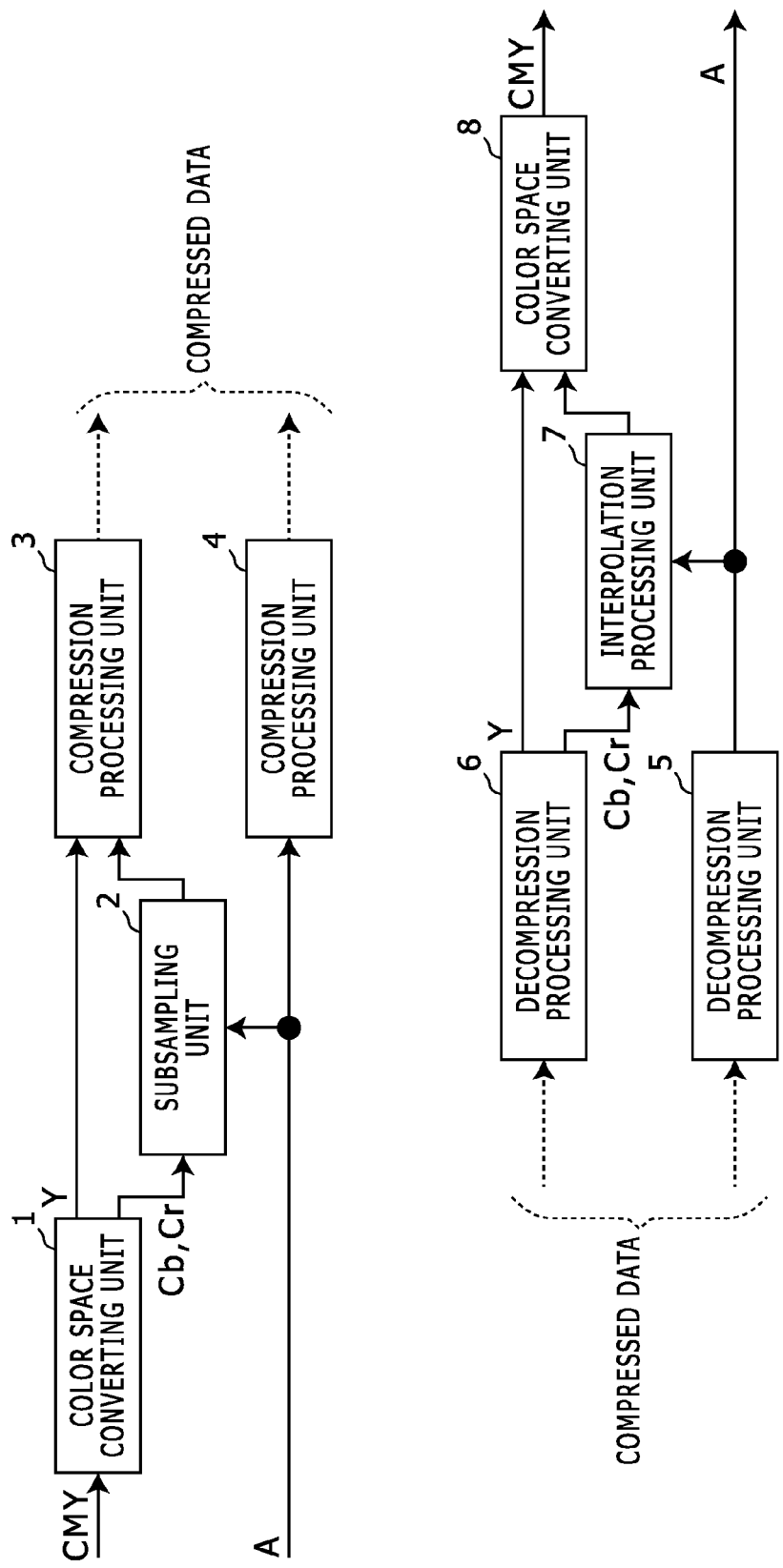
FIG. 1 shows a block diagram that indicates a configuration of an image compressing/decompressing apparatus according to an embodiment of the present invention.

Hereinafter, an embodiment of the present invention will be explained with reference to drawings.

FIG. 1 shows a block diagram that indicates a configuration of an image compressing/decompressing apparatus according to an embodiment of the present invention. This image compressing/decompressing apparatus is included, for example in an image forming apparatus (i.e. a printer, a copier, a multi function peripheral or the like).

In a printing function, CMY planes and an attribute plane (A plane) are generated from PDL (Page Description Language) data. An A plane indicates existency of an edge of character or a line drawing at one bit per pixel. Here an A plane indicates existency of an edge on a white background at one bit per pixel.

In a copy function, CMY planes are generated from RGB image data of an image obtained by a built-in scanner, and the aforementioned A plane is generated from an area of a character or a line drawing detected in an image obtained by a built-in scanner.

The image compressing/decompressing apparatus includes a color space converting unit 1, a subsampling unit 2, compression processing units 3 and 4, decompression processing units 5 and 6, an interpolation processing unit 7, and a color space converting unit 8.

The color space converting unit 1 converts the aforementioned CMY planes to a luma plane and chroma planes (here a Y plane, a Cb plane and a Cr plane). These Y plane, Cb plane, Cr plane, and A plane have the same resolution.

The subsampling unit 2 converts pixel values of plural pixels in a pixel block in the chroma planes to one pixel value associated with the pixel block on the basis of values in the pixel block in the attribute plane that indicates existency of an edge at the predetermined resolution. Consequently, the resolution of the chroma planes is reduced.

Specifically, the subsampling unit 2 sets the aforementioned one pixel value as an average value of pixel values in the chroma plane on pixels with edges in the pixel block in the attribute plane. If the pixel block in the attribute plane includes no pixels with edges, the subsampling unit 2 sets the aforementioned one pixel value as an average value of pixel values in the chroma plane on all pixels in the pixel block.

FIG. 2 shows a diagram that explains an example of subsampling. In case of the subsampling shown in FIG. 2, a pixel block includes 2×2 pixels. On these four pixels, the Y plane has four pixel values Y00, Y01, Y10 and Y11; the Cb plane has four pixel values Cb00, Cb01, Cb10 and Cb11; the Cr plane has four pixel values Cr00, Cr01, Cr10 and Cr11; and the A plane has four pixel values A00, A01, A10 and A11.

Among these planes, the subsampling is performed for the Cb plane and the Cr plane, and thereby one pixel value Cb or Cr is obtained from four pixel values in the pixel block (Cb00, Cb01, Cb10, Cb11) or (Cr00, Cr01, Cr10, Cr11).

For example, if A00=A01=1 (1 is the value indicating that an edge exists) and A10=A11=0, then it is identified that Cb=(Cb00+Cb01)/2 and Cr=(Cr00+Cr01)/2.

Further, if A00=A01=A10=A11=0, then it is identified that Cb=(Cb00+Cb01+Cb10+Cb11)/4 and Cr=(Cr00+Cr01+Cr10+Cr11)/4.

The compression processing unit 3 performs a compression process using DCT or the like for a luma plane and the chroma planes for which the subsampling has been performed by the subsampling unit 2.

The compression processing unit 4 compresses the A plane as lossless.

The decompression processing unit 5 decompresses the A plane compressed by the compression processing unit 4.

The decompression processing unit 6 decompresses the compressed data generated in the compression process performed by the compression processing unit 3 to the luma plane and the subsampled chroma planes.

The interpolation processing unit 7 performs an interpolation process. The interpolation process restores the subsampled chroma planes to the original resolution. Specifically, the interpolation processing unit 7 sets pixel values of plural pixels in a pixel block in the chroma planes at the original resolution as the aforementioned one value associated with this pixel block.

However, in this embodiment, if the pixel block in the attribute plane includes both a pixel with an edge and a pixel without an edge, and a pixel value in the luma plane on the pixel without an edge in the pixel block is smaller than a predetermined threshold value, then the interpolation processing unit 7 sets pixel values in the chroma planes on the pixel without an edge as achromatic values (here Cb=128, Cr=128).

In FIG. 2, for example, if A00=A01=1 and A10=A11=0 and Y00<Th, then regardless of the values of Cb and Cr, it is identified that Cb00=Cr00=128.

The color space converting unit 8 converts the luma plane obtained by the decompression performed by the decompression processing unit 6 and the chroma planes obtained by the interpolation process performed by the interpolation processing unit 7 to CMY planes.

The following part explains a behavior of the aforementioned apparatus.

Upon obtaining data of CMY planes and A plane, the color space converting unit 1 converts the CMY planes to YCbCr planes.

The subsampling unit 2 performs subsampling for the Cb plane and the Cr plane among these planes in the aforementioned manner.

Subsequently, the compression processing unit 3 performs a compression process for the Y plane and the subsampled Cb and Cr planes. In addition, the compression processing unit 4 compresses the attribute plane as lossless.

In such a manner, compressed data of the inputted CMYA data is generated. This compressed data is stored in a storage device, and when using the original CMYA data, the original CMYA data is restored from the compressed data read from the storage device.

In this process, the decompression processing unit 5 decompresses the compressed A plane, and the decompression processing unit 6 decompresses the compressed YCbCr planes. At the time when finishing the decompression, the Cb plane and the Cr plane are still subsampled, and therefore, the interpolation processing unit 7 determines plural pixel values in the pixel block associated with the one aforementioned pixel value in the aforementioned manner. Consequently, the resolution of the Cb plane and the Cr plane is changed to the original resolution.

Subsequently, the color space converting unit 8 converts the Y plane obtained by the decompression performed by the decompression processing unit 6 and the Cb plane and the Cr plane obtained by the interpolation process performed by the interpolation processing unit 7 to CMY planes.

In the aforementioned embodiment, the subsampling unit 2 converts pixel values of plural pixels in a pixel block in the chroma plane to one pixel value associated with the pixel block on the basis of values in the pixel block in an attribute plane that indicates existency of an edge at the predetermined resolution; and the compression processing unit 3 performs a compression process for a luma plane and the chroma planes for which the subsampling has been performed by the subsampling unit 2.

Consequently, the pixel values obtained by the subsampling are adjusted on the basis of existency of an edge together with a favorable compression ratio by the subsampling, and therefore the subsampling is enabled with a favorable compression ratio and favorable image quality (in particular, image quality of a character or a line drawing), and a post process such as smoothing after decompression can be properly performed.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to image compression to keep an image in an image forming apparatus.

The invention claimed is:

1. An image compressing/decompressing apparatus, comprising:
a subsampling unit that performs subsampling of chroma planes at a predetermined resolution;
a compression processing unit that performs a compression process for a luma plane and the chroma planes for which the subsampling has been performed by the subsampling unit;
a decompression processing unit that decompresses compressed data generated in the compression process performed by the compression processing unit to the luma plane and the subsampled chroma planes; and an interpolation processing unit that performs an interpolation process, the interpolation process restoring the subsampled chroma planes to the predetermined resolution;

wherein the subsampling unit converts pixel values of plural pixels in a pixel block in the chroma plane to one pixel value associated with the pixel block on the basis of values in the pixel block in an attribute plane that indicates existency of an edge at the predetermined resolution;

wherein the subsampling unit sets the one pixel value as an average value of pixel values in the chroma plane on pixels with edges in the pixel block in the attribute plane; and if the pixel block in the attribute plane includes no pixels with edges, the subsampling unit sets the one pixel value as an average value of pixel values in the chroma plane on all pixels in the pixel block.

2. An image compressing/decompressing apparatus, comprising:
a subsampling unit that performs subsampling of chroma planes at a predetermined resolution;
a compression processing unit that performs a compression process for a luma plane and the chroma planes for which the subsampling has been performed by the subsampling unit;
a decompression processing unit that decompresses compressed data generated in the compression process performed by the compression processing unit to the luma plane and the subsampled chroma planes; and
an interpolation processing unit that performs an interpolation process, the interpolation process restoring the subsampled chroma planes to the predetermined resolution;
wherein the subsampling unit converts pixel values of plural pixels in a pixel block in the chroma plane to one pixel value associated with the pixel block on the basis of values in the pixel block in an attribute plane that indicates existency of an edge at the predetermined resolution, wherein if the pixel block in the attribute plane includes both a pixel with an edge and a pixel without an edge, and a pixel value in the luma plane on the pixel without an edge in the pixel block is smaller than a predetermined threshold value, then the interpolation processing unit sets pixel values in the chroma planes on the pixel without an edge as achromatic values.

3. An image forming apparatus, comprising
an image compressing/decompressing apparatus;
wherein the image compressing/decompressing apparatus comprises:
a subsampling unit that performs subsampling of chroma planes at a predetermined resolution;
a compression processing unit that performs a compression process for a luma plane and the chroma planes for which the subsampling has been performed by the subsampling unit;
a decompression processing unit that decompresses compressed data generated in the compression process performed by the compression processing unit to the luma plane and the subsampled chroma planes; and
an interpolation processing unit that performs an interpolation process, the interpolation process restoring the subsampled chroma planes to the predetermined resolution; and
the subsampling unit converts pixel values of plural pixels in a pixel block in the chroma plane to one pixel value associated with the pixel block on the basis of values in the pixel block in an attribute plane that indicates existency of an edge at the predetermined resolution;
wherein the subsampling unit sets the one pixel value as an average value of pixel values in the chroma plane on pixels with edges in the pixel block in the attribute plane; and
if the pixel block in the attribute plane includes no pixels with edges, the subsampling unit sets the one pixel value as an average value of pixel values in the chroma plane on all pixels in the pixel block.

4. An image forming apparatus, comprising
an image compressing/decompressing apparatus;
wherein the image compressing/decompressing apparatus comprises:
a subsampling unit that performs subsampling of chroma planes at a predetermined resolution;
a compression processing unit that performs a compression process for a luma plane and the chroma planes for which the subsampling has been performed by the subsampling unit;
a decompression processing unit that decompresses compressed data generated in the compression process performed by the compression processing unit to the luma plane and the subsampled chroma planes; and
an interpolation processing unit that performs an interpolation process, the interpolation process restoring the subsampled chroma planes to the predetermined resolution; and
the subsampling unit converts pixel values of plural pixels in a pixel block in the chroma plane to one pixel value associated with the pixel block on the basis of values in the pixel block in an attribute plane that indicates existency of an edge at the predetermined resolution, wherein if the pixel block in the attribute plane includes both a pixel with an edge and a pixel without an edge, and a pixel value in the luma plane on the pixel without an edge in the pixel block is smaller than a predetermined threshold value, then the interpolation processing unit sets pixel values in the chroma planes on the pixel without an edge as achromatic values.

* * * * *